United States Patent [19]

Persson et al.

[11] 4,346,771

[45] Aug. 31, 1982

[54] LOW-PROFILE, NON-PLATFORM WEIGH SCALE

[75] Inventors: Per-ölof G. Persson, Taberg; Göte A. Göterdal, Tenhult, both of Sweden

[73] Assignee: Flintab Vågsystem AB, Jönköping, Sweden

[21] Appl. No.: 281,303

[22] Filed: Jul. 8, 1981

[51] Int. Cl.³ .................... G01G 19/00; G01G 21/22
[52] U.S. Cl. ................................. 177/145; 177/262
[58] Field of Search ....................... 177/145, 253, 262

[56] References Cited

U.S. PATENT DOCUMENTS

| | | | |
|---|---|---|---|
| 3,961,675 | 6/1976 | Siegel | 177/145 X |
| 4,258,810 | 3/1981 | Suser | 177/253 X |
| 4,284,155 | 8/1981 | Soderholm | 177/211 |

Primary Examiner—George H. Miller, Jr.
Attorney, Agent, or Firm—Staas & Halsey

[57] ABSTRACT

A device, particularly suited for weighing loads carried on pallets, featuring a low-profile, non-platform, U-shaped, shear-beam load cell scale adapted to receive a load moved by a pallet mover. The forks on the pallet mover can be lowered to the point where they are free of contact with the loaded pallet, so that the pallet mover is being supported by the floor in an opening defined by horizontally-extending legs of the U-shaped frame while the pallet and its load are supported by the legs of the U-shaped scale frame. This allows the weighing operation to be accomplished without moving the pallet mover away from the scale.

24 Claims, 12 Drawing Figures

LOW-PROFILE, NON-PLATFORM WEIGH SCALE

BACKGROUND OF THE INVENTION

This invention relates to a weigh scale. More particularly, this invention relates to an industrial, low-profile, non-platform type of weigh scale adapted to rest on a building floor or the like and particularly suited for weighing loads carried on pallets.

Many kinds of items and materials are handled and transported regularly in all types, kinds and fields of industry. A great deal of industrial handling is performed using pallets for loading thereon various items and moving the loaded pallets by powered fork-lift trucks and lower-cost manually-operated pallet movers. It is often convenient to determine the weight of the palletized material at some time during handling. Conventionally, scales used for the purpose of weighing items and materials handled in industry have been essentially three types:

The first is weigh scales which are connected directly to the powered fork-lift trucks. Normally, the scale either rests on the forks of the fork-lift truck or is incorporated into the fork-lift mechanism of the truck by using hydraulic cylinders. Having the scale incorporated in the fork lift of the powered fork-lift truck allows weights to be taken each time an item is lifted. However, the significant disadvantage of this type of weigh scale is that it is fixed to the fork-lift truck and thus requires operation of that particular powered truck for weighing all the necessary materials that have to be handled. This would thus require fitting of weigh scales on all fork-lift trucks, or would require only one operator of a fork-lift truck to achieve all the weighing of the handled material and thus likely limit use of the powered fork-lift truck for other non-weighing operations. Moreover, it can require a costly and complicated assembly of the weigh scale to be part of the truck itself. Finally, this type of weigh scale does not always provide an accurate weigh measurement due to the necessity of placing the load onto two parallel forks of a moving vehicle and the instability thereof when measurement occurs.

There are other scales which have been incorporated onto fork-lift trucks and they are made up of scale beams connected to the sides of the truck which are swung into operating position once the fork lift raises the load to a point above the horizontal plane of the scale beams. After weighing, the load is again raised to allow the scale beams to be swung into the non-operating position. Of course, the time needed to swing the scale beams between every weight measurement is a major disadvantage. This scale also suffers from the disadvantages discussed above.

Such systems assembled to fork-lift trucks and movers are shown in U.S. Pat. Nos. 2,638,336, 2,940,746, and 3,431,992.

The second type of scale is concerned with weigh scales of a platform-type which require construction of a "pit" in the building floor to house the operating mechanism. The platform is more or less flush with the surrounding floor or road area to enable powered fork-lift trucks or the manually-operable pallet movers to drive onto the platform with the load to be weighed.

In the normal operation of such scales, a fork-lift truck and the load resting on the pallet are weighed together. This weight is then substracted from the known or tare weight of the fork-lift truck and the operator so that the weight of the load alone can be determined. The major disadvantage to this operation is that it leads to inaccurate weight measurements, especially when the weight of the load is far lighter than the truck. Also, for example, if the fork-lift truck operator who was involved in the weighing of the fork-lift truck alone is different from the operator who later performs the weighing of the truck, pallet and load, the different weights of the operators could cause a degree of inaccuracy in the weighing. Similarly, different amounts of fuel in the fuel tank of the vehicle could affect the weighing accuracy. To remedy the above inaccuracies, the tare weight of the fork-lift truck and operator could be determined just before each weighing of the truck, pallet and load. However, this would greatly increase the overall time required for taking weight measurements. Alternatively, the truck or pallet mover used to move the load onto the platform can be removed from the platform each time a measurement is to be taken. Once a measurement is taken, the truck or pallet mover would then be moved back onto the platform to remove the weighed load. Of course, while this may ensure a more accurate weight measurement, the overall time required for taking weight measurements is greatly increased.

The above type of "pit" platform scale is briefly discussed in U.S. Pat. No. 3,472,329. It can be seen that the "pit" platform scale is a permanent weigh scale, requires expensive construction, and requires a very time-consuming operation of either weighing the truck both with and without the load, or by driving the truck or pallet mover with the loaded pallet onto the platform of the weigh scale, unloading the palletized items onto the platform, driving off the platform and then driving back onto the platform after the weighing operation has been achieved.

The third type of weigh scale is a drive-on elevated platform type of scale constructed to rest on the building floor or the like, but does not require a "pit." The scale comprises a platform and suspension-type load cell assembly made up of columns of strain gauge load cells and short lengths of suitable flexible connector, such as steel strand cable. For stabilizing the weigh platform from side forces, transverse and longitudinal check links are provided. The side frame members of the scale extend above the drive-on platform and necessarily are the height of the platform plus the height of the suspension-type load cell assembly, making the total height of the scale about twice the size of the load cell. This type of platform has a ramp positioned at at least one end of the platform to enable a fork-lift truck to drive onto the weighing platform and thus the scale normally requires secure anchoring to the floor. The above type of elevated platform scale is shown in U.S. Pat. No. 3,472,329. This scale appears to require use of a powered fork-lift truck to move the item onto the platform instead of a manually-operable pallet mover because of the steepness of the ramp. Again, as with platform scales requiring a "pit," in order to weigh the load, the truck usually is weighed alone first and compared to the weight of the truck, pallet and load. However, as stated above, this process is both inaccurate and time-consuming. Alternatively, once the load to be weighed is positioned on the platform, it is possible that the load mover be removed in order to perform the weighing measurement. However, this weigh procedure for the scale is also a very time-consuming operation.

Industrial weigh scales should be simple in construction, economical, efficient, versatile, and accurate. These goals are achieved by scales which, inter alia:

(1) have the least original investment, e.g., those which do not require the construction of a "pit" or the use of expensive, powered fork-lift trucks;

(2) do not require the extra time needed to weigh the truck alone first without the load, to move scale beams connected to the fork truck into operating position or to remove the item mover from the scale between each weighing measurement;

(3) have the least amount of mechanical parts by not employing an elaborate platform suspension assembly, thereby reducing costs and ensuring a long-lasting weigh scale;

(4) do not require anchoring to the floor, thereby facilitating portability;

(5) are stable and accurate by employing a configuration of top force-receiving shear beam load cells which function even on an uneven surface and which do not require an elaborate suspension mechanism or links;

(6) require the least height by employing top force-receiving shear beam load cells supporting the upper surface of the scale without an elaborate suspension mechanism; and (7) do not require a pallet mover to be powered in order to move heavy loads up ramps leading to an elevated platform of a scale.

SUMMARY OF THE INVENTION

Accordingly, it is a primary object of this invention to eliminate the above-described problems in conventional industrial weigh scales, yet maintain all the required features, including accuracy, and achieve significant additional goals, including simplicity in construction, economy, efficiency and versatility, for an industrial weigh scale.

A specific object of this invention is to provide a low-profile, non-platform scale, not requiring the construction of a "pit," thereby resulting in a simpler, less costly and more versatile weigh scale.

It is another object of this invention to provide a low-profile, non-platform scale that is constructed to rest on a building floor or the like, does not require attachment to a powered fork-lift truck and eliminates the requirement of weighing the truck without the load and the requirement that scale beams located on powered fork-lift trucks be moved into operational position after the load has been raised by the powered fork-lift truck. This results in a more versatile and accurate weigh scale.

Yet another object of this invention is to provide a low-profile, non-platform scale which does not require the pallet mover to be removed from a platform of the weigh scale between every weight measurement to ensure an accurate weight, thereby resulting in less time spent in taking weight measurements.

It is another object of this invention to provide a low-profile, non-platform scale using a configuration of top force-receiving shear beam load cells connected to the upper surface of the scale, thereby resulting in a simpler construction for the weigh scale, improving the stability and accuracy of the weigh scale, and providing the lowest possible height profile for the weigh scale.

It is another object of this invention to provide a low-profile, non-platform scale which can rest on a building floor or the like and does not require anchoring to the floor, thereby increasing its portability and therefore its versatility.

Finally, it is an object of this invention to provide a rampless, low-profile scale not requiring a powered fork-lift truck to move heavy loads up the ramps onto a platform, thereby allowing manual pallet movers to handle loads that are to be weighed.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the weighing device comprises a low-profile, non-platform type of weigh scale which rests on an underlying support surface and only receives an item support means with a load to be weighed loaded thereon. The scale includes a frame having at least two horizontally-extending legs partially enclosing an area of the underlying support surface for defining an opening therebetween for receiving an item mover moving the load to be weighed, the legs having an upper member for directly receiving the item support means with the load to be weighed thereon, and a lower member for resting on the underlying support surface; load cells positioned between the upper and lower members; and signal output means for the load cells.

In one preferred embodiment of the weigh scale, the frame of the scale has a U-shaped configuration and comprises first and second horizontally-extending legs and a horizontally-extending frame section connecting the legs and having an upper member and a lower member for resting on the underlying support surface, wherein the first and second legs partially enclose the area of the underlying support surface to define the opening for receiving an item mover, and wherein the load cells comprise a load cell positioned between the upper and lower members of the leg-connecting frame section, and a load cell positioned between the upper and lower members of each leg.

Preferably, in the scale having the two-legged, U-shaped frame, the shear beam load cell positioned in each of the two legs is located at a section farthest from the leg-connecting frame section and the cell positioned in the leg-connecting frame section is located substantially midway between the ends of the frame section.

In the above-described preferred embodiment of the weigh scale, the upper members of the legs and frame section have a substantially flat top surface for directly receiving thereon the item support means with the load to be weighed thereon. Preferably, the legs further include surfaces extending from the upper members of the legs and frame section toward the underlying support surface. The upper members of the legs and frame section therefore form a reverse-U cross-section and the load cells are connected to the inner portion of the upper members and have load-supporting elements resting on the respective lower members of the legs and frame section.

In a modification to the preferred embodiment of the two-legged, U-shaped weigh scale, instead of the flat top surface of the upper members of the legs and frame section directly receiving the item support means, shelves project substantially perpendicular from the side surfaces of the legs facing the partially-enclosed area of the underlying support surface for receiving thereon the item support means.

In yet another modification, not only the side surfaces of the two legs but also the side surface of the leg-connecting frame section facing the partially enclosed area of the underlying support surface has a shelf projecting substantially perpendicular from the side surface for receiving thereon a portion of the item support means.

In yet another preferred embodiment of the scale, the frame of the scale has an E-shaped configuration and comprises two horizontally-extending outside legs, an inside horizontally-extending leg, and a horizontally-extending frame section connecting the legs and having an upper member and a lower member for resting on the underlying support surface, with the legs being positioned for defining openings for forks of an item mover and wherein the load cells comprise a load cell positioned between the upper and lower members of the leg-connecting frame section, and a load cell positioned between the upper and lower members of each leg.

Preferably, in the scale having the three-legged, E-shaped frame, the load cell positioned in each of the three legs is located at a section farthest from the leg-connecting frame section and the load cell positioned in the leg-connecting frame section is located substantially midway between the ends of the frame section.

All of the above-noted embodiments of the weigh scale are particularly adapted for weighing items carried on a pallet, with the pallet being moved by a pallet mover, such as a manually-operated pallet mover commonly used in industry.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

As noted above, the present invention relates to an industrial weigh scale which rests on an underlying support surface, such as a building floor or the like, and only receives an item support means, such as a pallet, with items to be weighed loaded thereon. That is, the pallet with the load thereon is moved by a pallet mover or powered fork-lift truck so that the loaded pallet can be directly positioned onto the weigh scale without interference from the pallet mover or powered fork-lift truck and without removal of the pallet mover or fork-lift truck from the weigh scale during weighing operations. In accordance with the invention, the weigh scale is constructed such that it is simple in construction, requires no installation, provides accurate weighing of the load positioned on the pallet, is economical and versatile, and reduces the item handling and weighing time.

Figure 1:
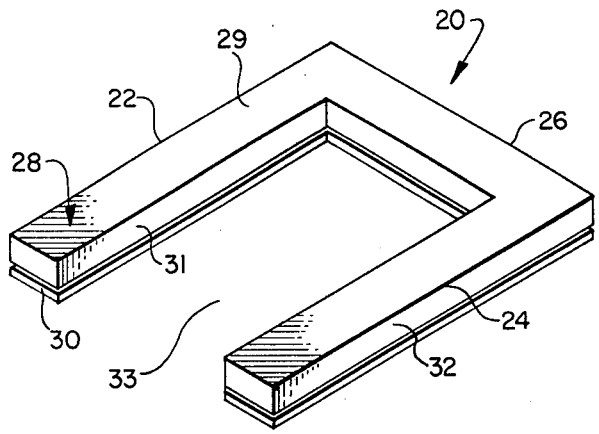
FIG. 1 is a perspective view of a weigh scale in accordance with a first preferred embodiment of the invention, employing a U-shaped frame configuration.

In accordance with the invention, the weigh scale comprises a frame with a load-receiving upper member and a lower support member, and load cells positioned between the upper and lower frame members. In a first preferred embodiment of the scale as illustrated in FIG. 1, the scale includes a frame 20 of a U-shaped configuration. The frame 20 comprises first and second horizontally-extending legs 22 and 24 and a horizontally-extending frame section 26 connecting the legs 22 and 24. The legs 22 and 24 and frame section 26, moreover, form a continuous upper member 28 for directly receiving an item support means, such as a pallet, with items to be weighed loaded thereon, and a continuous lower member 30 for resting on the underlying support surface, such as a building floor or the like. It can be seen that the upper member 28 and lower member 30 can be formed of a one-piece steel plate or can have various parts thereof welded together to form the continuous members.

Preferably, and as can be seen from FIG. 1, the upper member 28 further includes a substantially flat top surface 29 for directly receiving thereon the item support means, such as the pallet with the load to be weighed thereon, and side surfaces comprising inner side wall surfaces 31 and outside side wall surfaces 32 extending from the top surface 29 toward the underlying support surface. It can be seen that the upper member 28 of the legs 22 and 24 and frame section 26 thus has a reverse-U cross-section which is highly stiff and rigid for connecting the load cells to the inner portions of the reverse-U cross-section of that upper member 28 as will be described in greater detail hereinafter. In addition, these side surfaces are helpful to keep dirt out of, and to prevent interference with, the load cells positioned within the upper member 28 of the frame.

Figure 2:
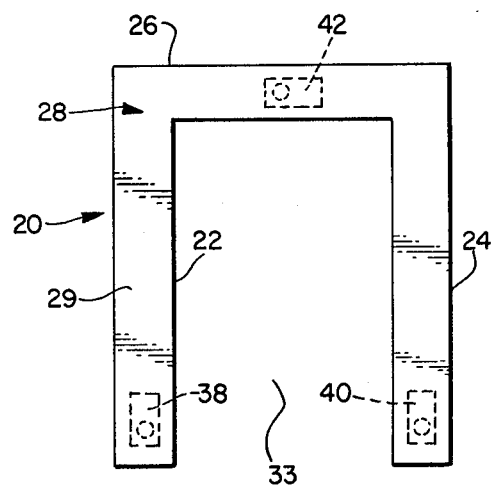
FIG. 2 is a top plan view of the scale shown in FIG. 1, illustrating in particular placement of load cells in the U-shaped frame.
Figure 4:
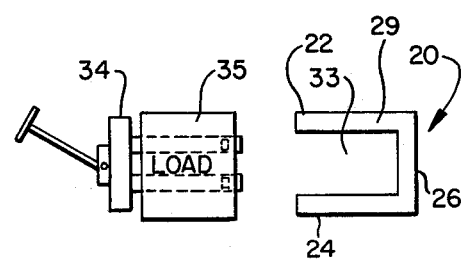
FIG. 4 is a top plan view of the scale of FIG. 1, illustrating in particular the approach of a manually-operated pallet mover having a pallet with a load carried thereon for positioning on the scale.

As best seen from FIGS. 1, 2, and 4, the legs 22 and 24 and frame member 26 partially enclose an area of the underlying support surface for defining an opening, generally designated by the numeral 33, between the legs 22 and 24 for receiving an item mover that is carrying the items to be weighed. In FIG. 4, a manually-operated pallet mover 34 having forks on which are positioned a pallet 35 loaded with items to be weighed is shown approaching the weigh scale.

Figure 3:
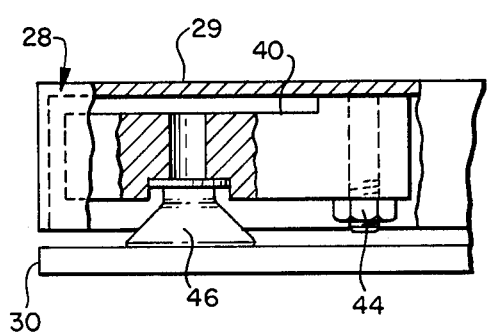
FIG. 3 is a partial fragmented side cross-sectional view of a load cell assembly employed in the scale of FIG. 1.
Figure 6:
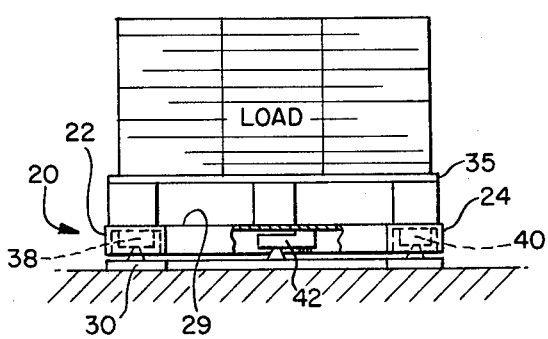
FIG. 6 is a front view of the scale of FIG. 1 showing the scale positioned on an underlying supporting surface, the load cells positioned in the frame, and a pallet with a load to be weighed positioned on the scale.

The weigh scale, as embodied herein and as seen in FIGS. 2, 3, and 6, further comprises load cells 38, 40, and 42 respectively positioned in the legs 22 and 24 and the frame section 26 between the upper and lower members 28 and 30. The weigh scale can use standard stock load cells, as they are known and readily available. It has been found, however, that a particularly suitable load cell is a shear beam load cell as described in U.S. Pat. No. 3,960,228. The arrangement of the shear beam load cells in the scale frame 20 is best seen by reference to FIG. 3 illustrating load cell 40. The shear beam load cell 40 is fixedly attached to the upper member 28 of the leg 24, by any suitable securing means, such as a bolt 44, and receives the load force of the palletized items positioned thereon. The load cell 40 has a support member 46 resting on the lower member 30 of the leg 24. As noted previously, the upper member 28 is formed with a reverse U-shaped configuration to increase the stiffness and rigidity of that load-receiving member. Because of the stiffness and rigidity of this upper member, it is preferable to attach the load cells to the inner portions of the upper member so that the load cells are securely and fixedly maintained in position by the stiff upper member when a heavy load is received by the weigh scale. The support members of the load cells can rest on the lower member 30 without being fixedly attached thereto due to the self-checking feature of the shear beam load cells being used and because of the higher vertical forces being exerted onto the lower member 30 in comparison to the side forces. In addition, by using the above-described type of shear beam load cell assembly, the overall height of the weigh scale is kept to a minimum, thus achieving the lowest profile weigh scale possible. This is particularly advantageous because it lowers the lifting height necessary when an item mover, such as pallet mover 35 depicted in FIG. 4, moves the palletized items onto the scale for weighing operations. This lowered height reduces the handling and weighing operation time and reduces the possibility of load spillage from the pallet mover.

As best seen in FIG. 2, it is preferable to position one load cell in each of the two legs 22 and 24 at a section of those legs farthest from the leg-connecting frame section 26 of the U-shaped configuration. Another load cell is positioned substantially midway in the leg-connecting frame section 26. Thus the three load cells 38, 40, and 42 are located in the frame as illustrated. It can be seen that the lower member 30 is not as rigid as the upper member 28 stiffened by side surfaces 31 and 32. This particular arrangement employing three load cells in a triangular configuration, like a tripod, allows a load on the scale to be uniformly received by the load cells even on an underlying rough or uneven surface. That is, the lower member 30 and the load cells 38, 40, and 42 will conform to the unevenness of the underlying surface supporting the weigh scale. The scale's stability and weighing accuracy are therefore ensured. The load cells, of course, are electronically connected into any suitable signal output means (not shown) providing weight read-out, recordings, or otherwise utilizing the electrical signals generated thereby.

Figure 5:
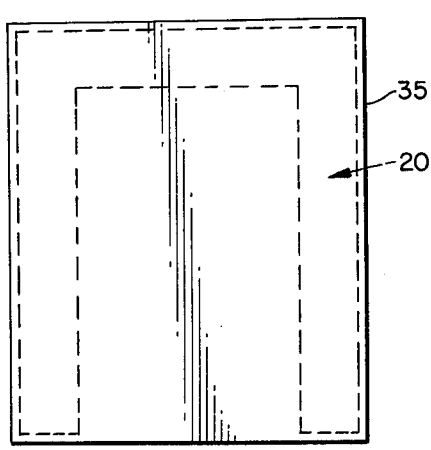
FIG. 5 is a top plan view of the scale of FIG. 1, illustrating in particular the placement of a pallet upon the upper surface of the frame for forming a platform for the scale.

To use the above-described weigh scale, and as illustrated in FIGS. 4 and 6, the manually-operated pallet mover 34 having forks on which are positioned the loaded pallet 35, is moved toward the weigh scale so that the loaded pallet 35 is located over the top surface 29 of the legs 22 and 24 and frame section 26 and in so doing, the forks of the pallet mover 34 are received in the opening 33 between the legs 22 and 24 without interference with the weigh scale. Once the loaded pallet is located over the weigh scale, the pallet 35 is lowered onto the top surface 29 of the scale so that the weighing measurement operating can occur. As can be seen, the pallet mover 34 need not be removed from the weigh scale since the pallet mover forks are lowered from the pallet in the scale opening 33 and thus are not interfering in any manner with the weigh measurement operation. If a platform type of weigh scale is desirable for certain weighing operations, the weigh scale, in accordance with the invention, can be transformed into such a platform-type scale by placing a pallet or a carrier platform onto the top surface 29 of the upper member 28 of the scale, as shown in FIG. 5. This, of course, would then allow placement of items to be weighed directly onto the scale platform.

Figure 7:
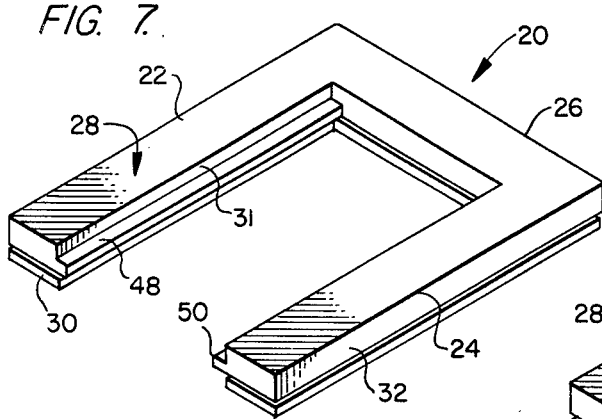
FIG. 7 is a perspective view showing a modification to the scale of FIG. 1.
Figure 9:
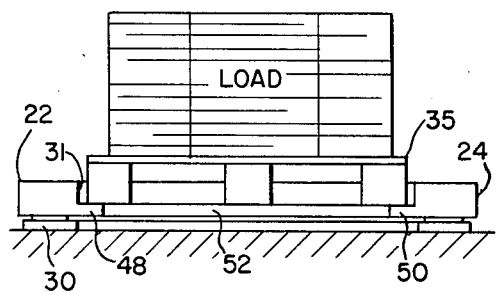
FIG. 9 is a front view of the scale of FIG. 8 showing the scale positioned on an underlying supporting surface, and a pallet with a load to be weighed positioned on the scale.

Now referring to FIG. 7, and in accordance with the invention, there is shown a modification to the embodiment of the U-shaped weigh scale of FIG. 1. More specifically, the weigh scale further comprises shelves 48 and 50 projecting substantially perpendicular from the inside wall surfaces 31 of the portion of the upper member 28 formed by the respective legs 22 and 24 for receiving the item support means with the load carried thereon, such as the loaded pallet 35 illustrated in FIG. 9. This, of course, is in contrast to the weigh scale of FIG. 1, wherein the substantially flat top surface 29 of the upper member 28 of the U-shaped scale frame receives the item support means, such as the loaded pallet 35.

Figure 8:
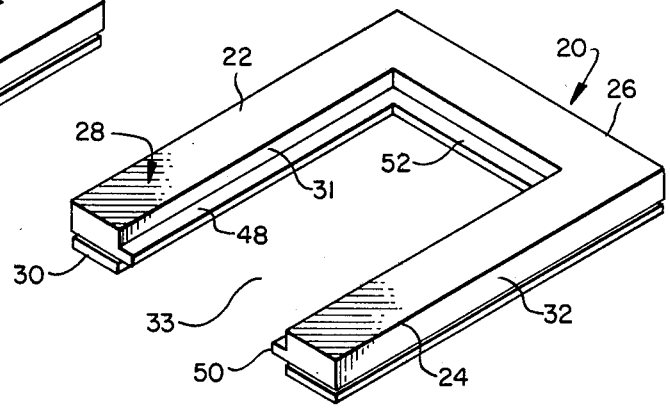
FIG. 8 is a perspective view showing another modification to the scale of FIG. 1.

In yet a further modification to the embodiment of the weigh scale of FIGS. 1 and 7, a third shelf 52, as best shown in FIG. 8, is provided projecting substantially perpendicular from the inside wall surface 31 of the portion of the upper member 28 formed by the frame section 26 and contiguous with the first shelves 48 and 50. This latter modified weigh scale is employed in the same manner as the scale depicted in FIG. 7, i.e., an item support means, such as the loaded pallet 35, is received and supported by the horizontally-extending shelves 48, 50, and 52. Use of the third shelf, 52 has the advantage of providing additional support for the loaded pallet when it is positioned on the weigh scale. Both of the modified weigh scales depicted in FIGS. 7 and 8 have the advantage of requiring less lifting height, in comparison to the scale depicted in FIG. 1, for positioning the loaded pallet onto the weigh scale. This is significant, particularly when a manually-operated pallet mover is handling the loaded pallet.

Figure 10:
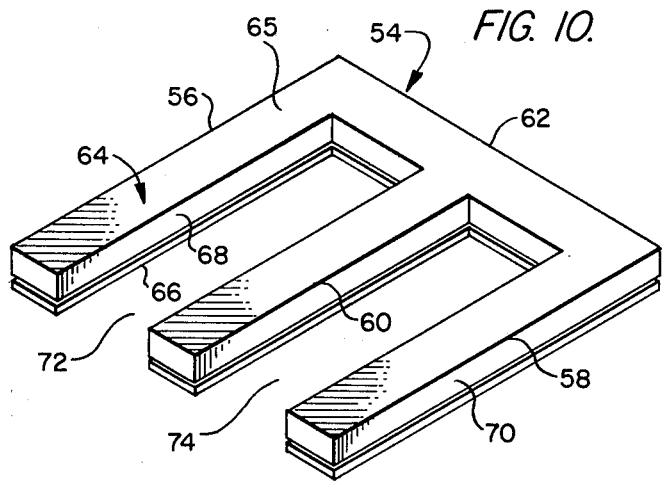
FIG. 10 is a perspective view of a weigh scale in accordance with a second embodiment of the invention, employing an E-shaped frame configuration.

In yet another preferred embodiment of the scale, as illustrated in FIG. 10, the weigh scale includes a frame 54 of an E-shaped configuration. The frame 54 comprises two outside horizontally-extending legs 56 and 58, an inside horizontally-extending leg 60, and a horizontally-extending frame section 62 connecting the legs 56, 58, and 60. Again, the legs 56, 58, and 60 and the leg-connecting frame section 62 form a continuous upper member 64 with a substantially flat top surface 65 for directly receiving an item support means, such as a pallet, with items to be weighed loaded thereon, and a continuous lower member 66 for resting on the underlying support surface, such as the building floor or the like. It can be seen that the upper member 64 and the lower member 66 can be formed of a one-piece steel plate or can have various parts thereof welded together to form the continuous members. Preferably, and as can be seen from FIG. 10, the upper member 64 further includes side surfaces comprising inner side wall surfaces 68 and outside side wall surfaces 70 extending from the top surface 65 toward the underlying support surface. The configuration of the upper member 64 is provided for the same reasons as described with respect to the preferred embodiment of the weigh scale shown in FIG. 1.

Figure 11:
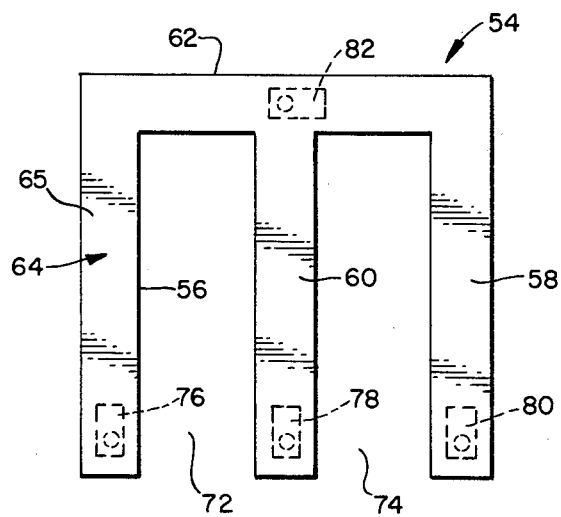
FIG. 11 is a top plan view of the scale shown in FIG. 10, illustrating in particular placement of load cells in the E-shaped frame.

As best seen from FIGS. 10 and 11, the legs 56, 58, and 60 and frame section 62 partially enclose areas of the underlying surface area for defining openings, generally designated by the numerals 72 and 74, between the various legs for receiving the forks of a pallet mover that is carrying the loaded pallet to be weighed on the scale.

Figure 12:
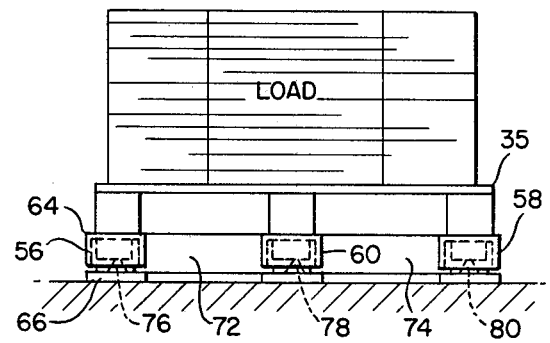
FIG. 12 is a front view of the scale of FIG. 10 showing the scale positioned on an underlying supporting surface, the load cells positioned in the frame, and a pallet with a load to be weighed positioned on the scale.

As best seen from FIGS. 11 and 12, the scale of this E-shaped embodiment further comprises load cells 76, 78, 80, and 82 respectively positioned in the horizontally-extending legs 56, 58, and 60 and leg-connecting frame section 62. In this embodiment, it is preferable to position one load cell in each of the three legs 56, 58, and 60 at a section of those legs farthest from the leg-connecting frame section 62 of the E-shaped configuration. Another frame cell is positioned substantially midway in the leg-connecting frame section 62. Thus, load cells 76, 78, 80, and 82 are located in the E-shaped frame as illustrated in FIG. 11. The load cells, of course, are again electronically connected into any suitable signal output means (not shown) for providing weight readout, recordings, or otherwise utilizing the electrical signals generated thereby. The use and general assembly of the shear beam load cells within the reverse U-shaped upper member 64 for this weigh scale embodiment again is similar to that described above for the preferred embodiment of the weigh scale illustrated in FIG. 1.

While the use of this latter weigh scale embodiment is again similar to the operation described above for the weigh scale of FIG. 1, the E-shaped weigh scale embodiment is particularly advantageous because it provides further support to pallets which are carrying thereon an extremely heavy load. That is, the bottom middle member of the pallet rests on the upper member 64 of the inner leg 60 for further support. A pallet mover having forks on which is positioned the loaded pallet is moved toward the weigh scale so that the loaded pallet is located over the top surface 65 of the upper member 64 of all three legs 56, 58, and 60 and the leg-connecting frame section 62 and, in so doing, the forks of the pallet mover are received in the two openings 72 and 74 formed between the legs without interference with the weigh scale. Positioning of the loaded pallet on the E-shaped weigh scale embodiment is illustrated in FIG. 12.

It can be seen from the foregoing written description of the preferred embodiments and accompanying drawings of the weigh scale in accordance with the invention that the forks of the pallet mover carrying a loaded pallet are moved into the partially-enclosed area of the underlying support surface formed by the legs of the frame. The pallet mover's forks are then lowered allowing the loaded pallet to rest on the upper member of the scale frame, i.e., either the top surface or the shelves. The forks are further slightly lowered to the point where they are free of contact with the pallet. The pallet and its load are now supported entirely by the scale, while the pallet mover remains on the floor with the pallet mover forks in the opening between the frame legs.

Unlike conventional platform-type scales, there is no need to bolt this scale to the floor because the pallet mover does not have to drive up a ramp to a platform. This further allows versatility in use of a manually-operated pallet mover which could not be used for fairly heavy loads when it was necessary to drive the manually-operated pallet mover up a ramp to a platform. Moreover, to ensure an accurate weight measurement of the load to be weighed, fork-lift trucks should be removed from a platform-type scale to perform the weigh measurement. If the fork-lift truck was not removed from the platform scale, the weigh measurement could be inaccurate, particularly when the loaded pallet was of a low weight in comparison to the fork-lift truck. Because a pallet mover or fork-lift truck with its lowered forks will not interfere with the operation of the scale of this invention during weighing, there is no need to remove the pallet mover or truck from the scale area between weighings. Not having to remove the pallet mover or truck minimizes the time needed for each weighing. Moreover, a very accurate weigh measurement is achieved by the scale of this invention.

It will be apparent to those skilled in the art that modifications and variations could be made in the scale device in accordance with teachings of the invention without departing from the spirit or scope of the invention. Thus, it is intended that the present invention cover the modifications and variations of this invention within the scope of the appended claims and their equivalents.

We claim:

1. A low-profile, non-platform type of weigh scale which rests on an underlying support surface and only receives an item support means with a load to be weighed thereon, said scale comprising:
   a frame having at least two horizontally extending legs partially enclosing an area of the underlying support surface for defining an opening therebetween for receiving an item mover moving the load to be weighed, said legs having an upper member for directly receiving the item support means with the load to be weighed thereon, and a lower member for resting on the underlying support surface;
   load cells positioned between said leg upper and lower members; and
   signal output means for said load cells.

2. The scale of claim 1, wherein said frame has a U-shaped configuration and comprises first and second horizontally-extending legs and a horizontally-extending frame section connecting said legs and having an upper member and a lower member for resting on the underlying support surface, wherein said first and second legs partially enclose the area of the underlying support surface for defining the opening for receiving an item mover, and wherein the load cells comprise a load cell positioned between said upper and lower members of said leg-connecting frame section, and a load cell positioned between the upper and lower members of each leg.

3. The scale of claim 2, wherein the upper members of said legs and frame section have a substantially flat top surface for directly receiving thereon the item support means.

4. The scale of claim 2, wherein the legs further include side surfaces extending from the upper members of said legs and frame section toward the underlying support surface.

5. The scale of claim 4, wherein said side surfaces of the first and second legs facing the partially-enclosed area of the underlying support surface have shelves projecting substantially perpendicular from said side surfaces for receiving thereon the item support means.

6. The scale of claim 4, wherein said side surfaces of the first and second legs and leg-connecting frame section facing the partially-enclosed area of the underlying support surface have shelves projecting substantially perpendicular from said side surfaces for receiving thereon the item support means.

7. The scale of claim 4, 5, or 6, wherein the upper members of said legs and frame section have a reverse-U cross-section and wherein the load cells are connected to the inner portions of the upper members and have load-supporting elements resting on the respective lower members of said legs and frame section.

8. The scale of claim 2, wherein the load cell positioned in each of the two legs is located at a section farthest from the leg-connecting frame section of the U-shaped configuration and the load cell positioned in the leg-connecting frame section is located substantially midway between the ends of the frame section.

9. The scale of claim 7, wherein the load cell positioned in each of the two legs is located at a section farthest from the leg-connecting frame section of the U-shaped configuration and the load cell positioned in the leg-connecting frame section is located substantially midway between the ends of the frame section.

10. The scale of claim 1, 2, 3, 4, 5, 6, or 8, wherein an item support means is placed on the upper members to define a scale platform for receiving loads to be weighed.

11. The scale of claim 1, wherein said frame has an E-shaped configuration and comprises two horizontally-extending outside legs, an inside horizontally-extending legs, and a horizontally-extending frame section connecting said legs and having an upper member and a lower member for resting on the underlying support surface, wherein said legs are positioned for defining openings for forks of an item mover, and wherein the load cells comprise a load cell positioned between said upper and lower members of said leg-connecting frame section, and a load cell positioned between the upper and lower members of each leg.

12. The scale of claim 11, wherein the upper members of said legs and frame section have a substantially flat top surface for directly receiving thereon the item support means.

13. The scale of claim 12, wherein the legs and leg-connecting frame section further include side surfaces extending from the top surfaces of said upper members toward the underlying support surface.

14. The scale of claim 13, wherein the upper members of said legs and frame section have a reverse-U cross-section and wherein the load cells are connected to the inner portions of the upper members and have load-supporting elements resting on the respective lower members of said legs and frame section.

15. The scale of claim 11, wherein the load cell positioned in each of the three legs is located at a section farthest from the leg-connecting frame section of the E-shaped configuration and the load cell positioned in the leg-connecting frame section is located substantially midway between the ends of the frame section.

16. The scale of claim 14, wherein the load cell positioned in each of the three legs is located at a section farthest from the leg connecting frame section of the E-shaped configuration and the load cell positioned in the leg-connecting frame section is located substantially midway between the ends of the frame section.

17. The scale of claim 11, 12, 13, or 15, wherein an item support means is placed on the upper surface of the upper member to define a scale platform for receiving loads to be weighed.

18. The scale of claim 1, 2, 3, 5, 6, 8, 11, 12, or 15, wherein the item support means is a pallet and the items to be weighed are moved by a pallet mover having forks, and wherein the partially enclosed area formed by said legs of the scale frame defines an opening for receiving the forks of the pallet mover as the pallet is positioned onto the load-receiving upper members.

19. A low-profile, non-platform type of weigh scale which rests on an underlying support surface and receives items carried on a pallet, the pallet being moved by a pallet mover having forks, the scale comprising:

a frame having at least two horizontally-extending legs partially enclosing an area of the underlying support surface for defining an opening therebetween for receiving the forks of the pallet mover, said frame having a lower member for resting on the underlying support surface and an upper member for directly receiving thereon the pallet, after the forks of the pallet mover carrying the pallet thereon are positioned in the opening between said legs;

load cells positioned between said leg upper and lower members; and signal output means for said load cells.

20. The scale of claim 19, wherein said frame has a U-shaped configuration and comprises first and second horizontally-extending legs and a horizontally-extending frame section connecting said legs and having an upper member and a lower member for resting on the underlying support surface, wherein said first and second legs partially enclose the area of the underlying support surface for defining the opening for receiving the forks of the pallet mover, and wherein the load cells comprise a load cell positioned between said upper and lower members of said leg-connecting frame section, and a load cell positioned between the upper and lower members of each leg.

21. The scale of claim 20, wherein the load cell positioned in each of the two legs is located at a section farthest from the leg-connecting frame section of the U-shaped configuration and the load cell positioned in the leg-connecting frame section is located substantially midway between the ends of the frame section.

22. The scale of claim 20, wherein the upper members of said legs and frame section have a substantially flat top surface for directly receiving thereon the pallet.

23. The scale of claim 19, wherein said frame has an E-shaped configuration and comprises two horizontally-extending outside legs, an inside horizontally-extending leg, and a horizontally-extending frame section connecting said legs and having an upper member and a lower member for resting on the underlying support surface, wherein said legs are positioned for defining openings for the forks of the pallet mover, and wherein the load cells comprise a load cell positioned between said upper and lower members of said leg-connecting frame section, and a load cell positioned between the upper and lower members of each leg.

24. The scale of claim 23, wherein the load cell positioned in each of the three legs is located at a section farthest from the leg-connecting frame section of the E-shaped configuration and the load cell positioned in the leg-connecting frame section is located substantially midway between the ends of the frame section.

* * * * *